Sept. 23, 1969    D. L. KLASS ET AL    3,468,167
INERTIALLY RESPONSIVE DEVICE

Filed Sept. 12, 1966    3 Sheets-Sheet 1

INVENTORS.
DONALD L. KLASS
THOMAS W. MARTINEK
ROBERT M. HAINES

ATTORNEY.

Sept. 23, 1969  D. L. KLASS ET AL  3,468,167
INERTIALLY RESPONSIVE DEVICE
Filed Sept. 12, 1966  3 Sheets-Sheet 2

INVENTORS.
DONALD L. KLASS
THOMAS W. MARTINEK
ROBERT M. HAINES

*William S. Brown*
ATTORNEY.

INVENTORS.
DONALD L. KLASS
THOMAS W. MARTINEK
ROBERT M. HAINES

ATTORNEY.

# United States Patent Office 3,468,167
Patented Sept. 23, 1969

3,468,167
INERTIALLY RESPONSIVE DEVICE
Donald L. Klass, Barrington, and Thomas W. Martinek, Danville, Ill., and Robert M. Haines, Placentia, Calif., assignors to Union Oil Company of California, Los Angeles, Calif., a corporation of California
Filed Sept. 12, 1966, Ser. No. 578,635
Int. Cl. G01p 15/02
U.S. Cl. 73—516                               18 Claims

ABSTRACT OF THE DISCLOSURE

The motion of a mass in space is monitored by disposing that mass along at least one line of force by a system comprising at least one shear responsive fluid cell containing a shear responsive fluid subject to change in an electrokinetic property proportional to shear and monitoring the value of that property of fluid containing in the shear responsive fluid cell.

---

This invention relates to an apparatus and method utilizing the electrokinetic properties of a shear-responsive liquid to indicate, measure and/or record the relative spacial movement of a body. More particularly, this invention relates to an apparatus and method utilizing the electrokinetic properties of a shear-responsive liquid to indicate, measure and/or record the acceleration, deceleration, velocity, distance-traveled, and the direction of travel of a body in any and all types of media.

The apparatus and method of this invention employs one or more of the numerous electrical phenomena exhibited when suspensions of certain solids in oils are subjected to shear stresses. When a suspension of non-conducting particles in an oleaginous vehicle of relatively low dielectric constant, such as a dispersion of silica in a mineral oil, is subjected to shear stress, as between opposing surfaces of two bodies moving with respect to each other, the dispersion exhibits changes in electrical properties, such as a decrease in D.C. resistance, a change in dielectric constant, and the generation of an induced potential. The magnitude of each of these phenomena depends upon the dispersion composition, the shear rate, the temperature, and the spacing between the opposing surfaces. The magnitude of the induced potential depends also upon the compositions of the opposing surfaces. The characteristics of these compositions, the properties they exhibit, and the several parameters involved in the generation of an induced potential are also discussed by Messrs. Klass, Haines, McEuen and Martinek in Ser. No. 332,484 filed Dec. 23, 1963, now U.S. Patent No. 3,196,963 issued July 27, 1965. For the purpose of this application, such suspensions are hereinafter designated "shear-responsive" or "electrodynamic" liquids or fluids and the asociated phenomena are hereinafter designated as the "electrokinetic properties" of the liquids or fluids.

In accordance with this invention, a film of an electrokinetic-electrostrictive liquid is disposed in this space between opposing surfaces of two relatively movable members. One of said members is connected to an inertial mass and the other to the object for which relative spacial movement determination is desired. The time rate of change of velocity, the speed, direction and the like of the object are related to the unidirectional or omnidirectional movement of said members as a result of said connections.

The method and apparatus of this invention is useful in any type of moving body in any type of media. The invention finds application in space craft, aircraft, land vehicles, ships, process equipment, measurements of moving bodies of liquids, fluidized systems and the like.

The apparatus comprises a device for measuring the relative spacial movement of a body comprising a rigid mass, a housing for the mass, at least a pair of electrokinetic-electrostrictive-couplings located between the mass and the housing, and means for moveably mounting the mass within the housing in at least one direction, with or without electrical circuit and/or measuring and/or recording means to indicate the changes in electrical properties of said couplings due to movement of the mass in relation to the housing.

The method of this invention involves the determination of the relative spacial movement of a body by disposing a mass along at least one directional axis between conductive spaced coupling surfaces within an electrokinetic-electrostrictive liquid, moving said mass in any relationship with said directional axis, causing a change in speed, direction or both in said movement, and determining the magnitude of said change by measuring said change in the electrokinetic property produced by said coupling.

More specificallly, the invention consists in an omnidirectional inertial mass connected to one or more pairs of electrokinetic-electrostrictive couplings, the couplings of a given pair being on opposite sides of the inertial mass. One coupling of the pair can function as an electrokinetic coupling while the other coupling can function as an electrostrictive coupling or both couplings can function as electrokinetic or electrostrictive couplings.

Accordingly, the primary object of this invention is to provide an apparatus and method for measuring the relative spacial movement of a body.

An object of this invention is to provide an apparatus and method utilizing the electrokinetic properties of a shear-responsive liquid to indicate, measure, and/or record the acceleration, deceleration, velocity, distance traveled and the direction of travel of a body in any and all types of media.

Another object of this invention is to provide a device for use in space craft, aircraft, land vehicles, ships, process equipment, measurements of moving bodies or streams of liquid, fluidized systems and the like, adapted to measure the relative spacial movement thereof.

An object of this invention is to provide an apparatus including a housing, a mass within said housing, at least one pair of electrokinetic-electrostrictive responsive devices or couplings connected to said mass, with or without means for determining the changes in electrical properties of said devices in response to the relative movement of the mass.

Another object of this invention is to provide an apparatus as described and shown herein.

Another object of this invention is to provide a method as described and demonstrated herein.

These and other objects of this invention will be described or become apparent as the specification proceeds and reference is made to the accompanying drawings in which.

Figure 1:
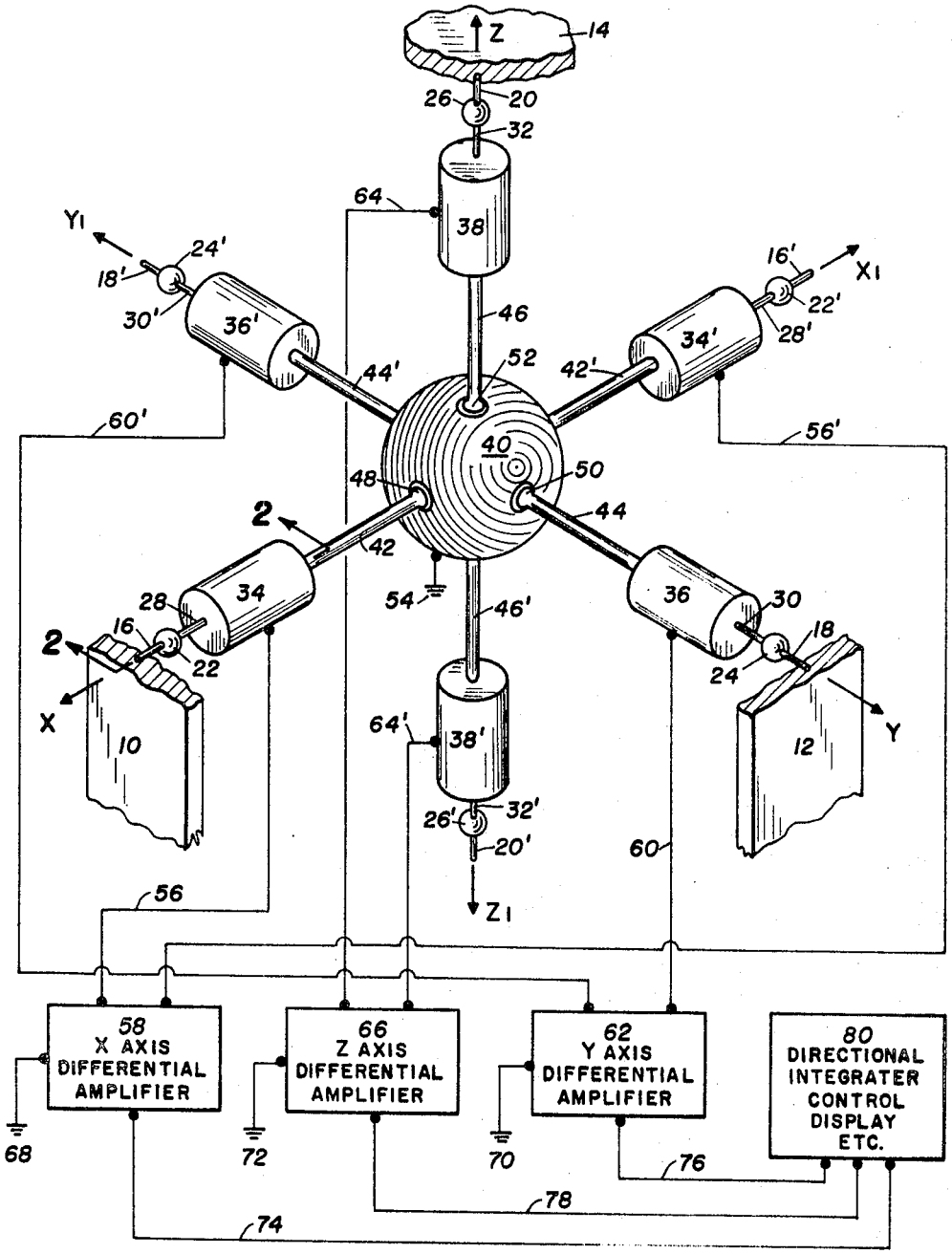
FIGURE 1 is an over-all view, partly schematic and partly in section, of a three-dimensional apparatus of this invention.

In FIGURE 1 there is shown a three-dimensional acceleration system comprising a housing to contain and support the system of which wall parts 10, 12 and 14 are illustrated as broken segments, said wall parts being attached to supporting arms 16, 18 and 20 through ball and socket members 22, 24 and 26 to rod members 28, 30 and 32, which in turn connect to fluid cells 34, 36 and 38, respectively. Each of said fluid cells is in turn attached to inertial mass 40 by means of connecting rods 42, 44 and 46, through a second set of ball and socket members 48, 50 and 52, which assembly is along the X, Y and Z axes of the inertial mass 40. The corresponding supporting arms, ball and socket members, rod members and fluid cells for each of these axial supports on the opposite sides of mass 40 along the same respective axes are shown by prime numbers. The opposite wall members of the housing are not shown for simplicity. Similarly, the opposite ball and socket members on inertial mass 40 are omitted. Correspondingly, the respective portions of each axis are indicated such as X and $X_1$, Y and $Y_1$ and Z and $Z_1$ for clarity. Inertial mass 40 is grounded to the housing member at 54.

Each of the opposite pairs of fluid cells in the system is connected to a differential amplifier for that respective axis. Thus, for the X axis fluid cell 34 is connected by electrical lead 56 and fluid cell 34' is connected by electrical lead 56' to differential amplifier 58; for the Y axis fluid cell 36 is connected by electrical lead 60 to differential amplifier 62 and fluid cell 36' is connected thereto by electrical lead 60'; and for the Z axis fluid cell 38 is connected by electrical lead 64 to differential amplifier 66 and fluid cell 38' is connected thereto by means of electrical lead 64'. Each of the differential amplifiers 58, 62, and 66 is grounded to the housing as shown at 68, 70 and 72 respectively, and these amplifiers are connected by means of electrical leads 64, 76 and 78 to differential integrator, control or display 80.

Figure 2:
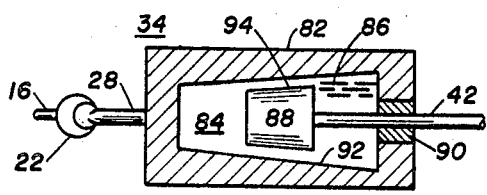
FIGURE 2 is a sectional view taken along lines 2—2 of cell 34 of FIGURE 1.

FIGURE 2 illustrates in partial cross-section one form of the construction of the fluid cells 34, 34', 36, 36', 38 and 38' of FIGURE 1. This cell comprises housing 82 having fluid chamber 84 containing electrokinetic-electrostrictive fluid 86 in which piston 88 operates from connecting rod 42. The corresponding supporting arm 16, 42, ball and socket member 22 and rod member 28, from FIGURE 1, are also shown in FIGURE 2. Insulated bushing 90 provides the proper electrical insulation and seal for rod 42 in the end wall of housing 82. The chamber 84 has tapered inner wall 92. In cross-section chamber 84 can be any desired shape and is preferably circular, square or hexagonal. A corresponding shape and outer wall design inherently causes piston 88 to give greater shear of fluid 86 when moved toward the apex of the taper than when moved toward the base of the taper.

Referring to FIGURES 1 and 2 the operation of the three-dimensional system is as follows. Any movement of inertial mass 40 with respect to the housing walls 10, 12 and 14 in any direction or any movement of inertial mass 40 along any of the axes causes a corresponding movement in the connecting rods in response thereto or along the same axes and a movement of the pistons in the fluid cells of the system. Movement of the piston or pistons causes a shearing of the electrokinetic fluid within all of the fluid cells. To illustrate: if the inertial mass 40 moves along the Z axis from $Z_1$ toward Z, shearing takes place in cells 38 and 38' with the greater amount of shear taking place in cell 38 due to the tapered cell construction. The electrical resistances of cells 38 and 38' are reduced by amounts proportional to the amount of shear in each cell. When an electrical current source is connected across each of these cells, this change in resistance causes two currents to flow of different magnitudes through electrical leads 64 and 64' to amplifier 66. Amplifier 66 produces an output signal proportional to the difference in magnitudes of these currents and proportional to the amount of acceleration of mass 40, and simultaneously indicates the acceleration direction from $Z_1$ toward Z. Because of the mechanical coupling system employed, all of the fluid cells in the system will undergo shear to some extent when mass 40 is moved. The shearing which takes place in cells 34 and 34' along the $X-X_1$ axis and cells 36 and 36' along the $Y-Y_1$ axis will produce currents of equal value which cancel out in their respective differential amplifiers 58 and 62. The output of all three differential amplifiers is fed into the differential acceleration integrator 80 which may be exemplified by an analogue computer, being employed to serve any desired function from the signals received, such as, for example, to control the acceleration and direction, with or without a visual display of the signal or other indications of the signal-integrating process.

Figure 3:
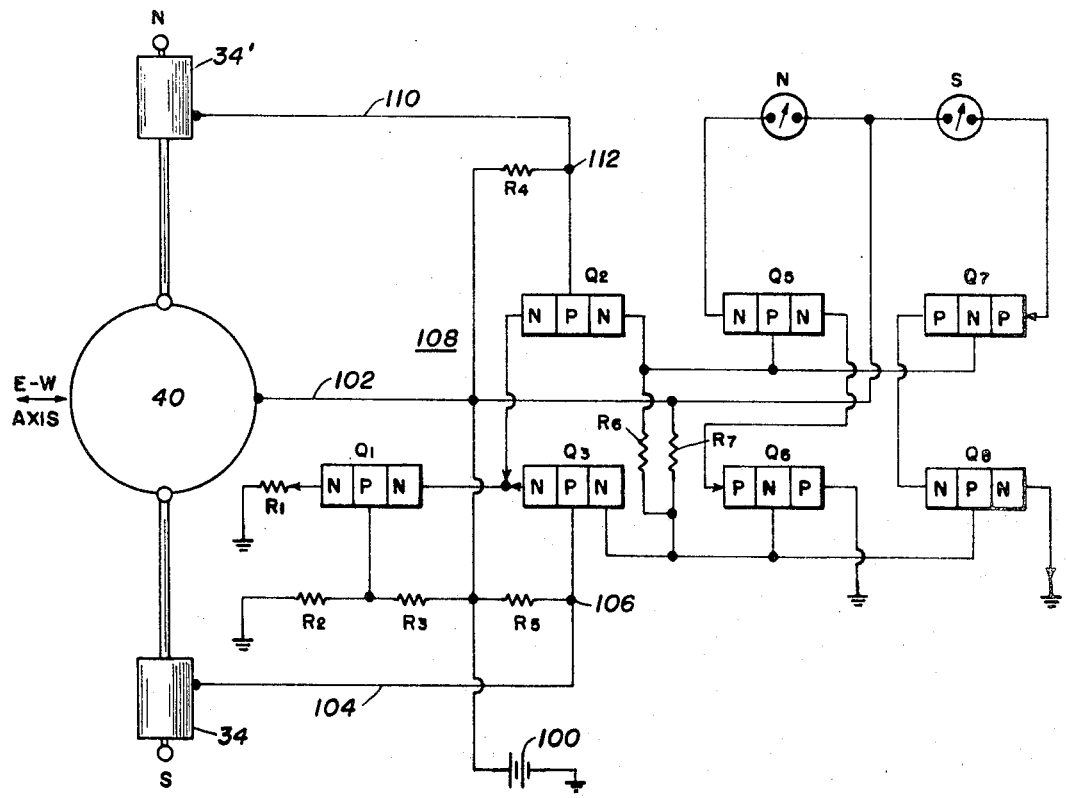
FIGURE 3 is a diagrammatic view showing one form of differential amplifier circuit.

FIGURE 3 illustrates one form of differential amplifier circuit useful in accordance with this invention, same being shown with the inertial mass 40 and any pair of fluid cells, e.g., fluid cells 34 and 34', operating in a vehicle in space moving along an east to west axis. Current source 100 is connected through lead 102 to inertial mass 40, as through the housing for the apparatus. Lead 104 connects cell 34 with terminal 106 of transistorized circuit 108 and lead 110 connects cell 34' to terminal 112 of said circuit.

Uniform spacial movement of the entire apparatus along the east-west axis causes no changes in mass 40. Acceleration of the vehicle in a northerly direction, as during a change in course from the east-west axis, will cause mass 40 to move toward the south cell 34 producing two signals, one in lead 104 and one in lead 110, the former being of greater magnitude than the latter due to the tapered shape of the cells and the direction of movement toward cell 34. These two signals are impressed on transistors $Q_2$ and $Q_3$, the current of larger magnitude in lead 104 causing transistor $Q_3$ to conduct more heavily than transistor $Q_2$. This causes a drop in voltage across resistor $R_7$ which causes transistor $Q_6$ (the PNP type) to conduct. Directional arrows are used to show the emitter sides of the transistors. Transistor $Q_1$ serves as a constant current device and thus serves to limit the current through transistor $Q_2$ (or $Q_3$ where it is conducting). This limitation on the current through $Q_2$ increases the voltage drop across resistor $R_6$, thus causing transistor $Q_5$ (NPN type) to conduct. When current flows in transistor $Q_5$ (NPN) and $Q_6$ (PNP), meter N indicates acceleration. Transistors $Q_7$ (PNP) and $Q_8$ (NPN) do not conduct at this time as they are of reversed polarity.

During those periods when the fluids in both cells 34 and 34' are sheared an equal amount, or not at all, due to movement along the east-west axis, $Q_2$ and $Q_3$ will both increase slightly in conductivity or remain of the same conductivity causing $Q_5$ and $Q_8$ to be cut off or remain static while $Q_6$ and $Q_7$ try to conduct or remain static. Since both transistors in each pair, that is $Q_5$, $Q_6$ and $Q_7$, $Q_8$ must conduct at the same time to convey a signal to meter N or meter S, and only one of each pair is able to conduct, no current will flow in either meter N or S. The signal measured by meters N and S is conveyed to integrator 80 by means of leads (not shown) and in a manner known to the art.

Figure 4:
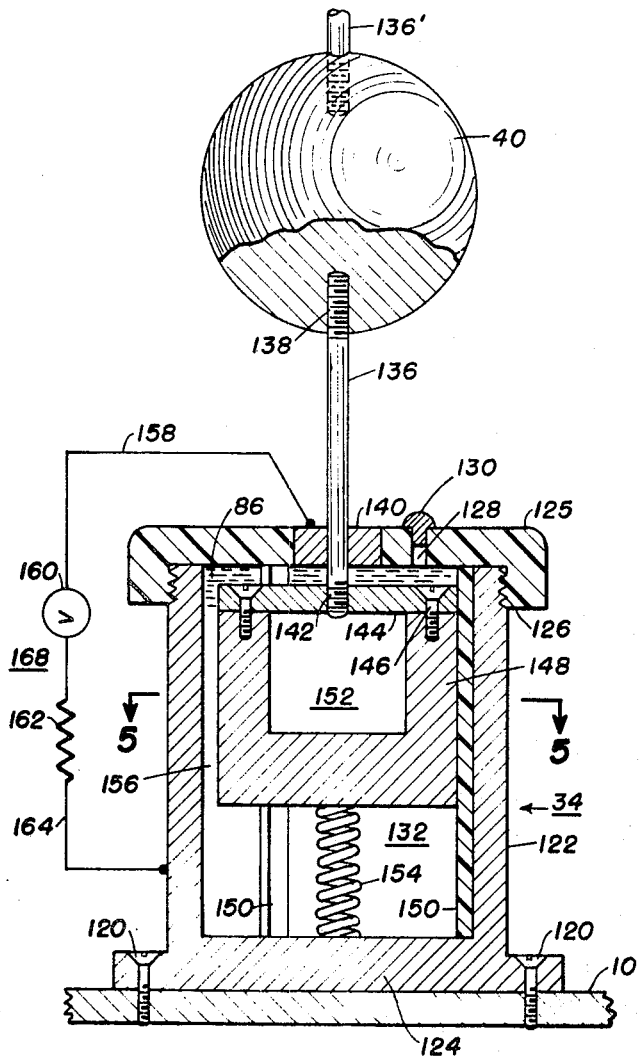
FIGURE 4 is a cross-sectional view of one form of cell 34 with indicating circuit.

FIGURE 4 is a partial cross-sectional view of a cell, connection-rod and inertial mass arrangement that can be used in accordance with this invention. The numeral 10 represents the wall of the housing enclosing the apparatus, to which is fastened by means of base screws 120, cell 34, having a cylindrical wall 122, closed to bottom or end wall 124 and an open top fitted with resilient insulating cap or cover member 125 and attached thereto by means of screw threads 126. An orifice 128 is provided in cap 125 with slip-fit plug 130 acting as a removable seal therefore.

Wall 122, bottom 124 and cap 125 form a chamber 132 containing electrokinetic-electrostrictive fluid 86 which completely fills same. Inertial mass 40 is directly attached to connecting rod 136 as by thread members 138 on one side and to an axially aligned connecting rod 136' to a second cell 34 (not shown). Connecting rod 136 extends in liquid-tight relationship through metal bushing 140 within cap 125 and is directly fastened as by screw threads 142 to top plate 144 in turn held by means of screws 146 to piston 148 within chamber 132 and within insulating spacers 150 extending along the inner walls of chamber 132. Piston 148 has recess 152 for adjustment of its weight during machining or during assembly and calibration and is attached to the bottom 124 by means of spring 154, welded or otherwise attached at its ends to both of these members.

Space 156 between wall 122 and piston 148 is preferably about 0.005 to 0.100 inch, although other dimensions may be used. The distance that piston 148 is reciprocally movable within cell 34 is not critical, however for most purposes and in the preferred embodiment the relative sizes of cell 34 and piston 148 are such that piston 148 will move, under the inertial thrust of mass 40 through rod 136, in this instance downwardly, a distance of at least about 0.1 to about 0.6 inch. For most purposes 0.5 inch movement is practical and gives a meaningful measurable signal from the fluid 86.

As seen from FIGURE 1, intertial mass 40 is movable in all directions to a degree depending on the resiliency of the connecting rods 42, 44, 46 etc. Considering the vertical movement of mass 40, it is seen to be opposed, for example by horizontal rods 42–44' and 44–44'. Ball and socket pivots 22, 24 and 26 are designed to allow more movement in any direction by providing a movable joint. In FIGURE 4 such movement is accomplished through resilient cover member 125 secured to cell 34. Cover 125 is fabricated of an electrically insulating, poorly conductive material such as rubber, any of the various electrically insulating and structural plastics and resins to include such well known proprietary products as Teflon, nylon, Bakelite and the equivalent. Bushing 140 is electrically conductive, same preferably being molded within cover 125 as an integral part thereof. Vent 128 serves to relieve any internal pressure resulting in assembly of the cell 34 so that space 132 is entirely filled with liquid 86. After assembly, vent 128 is sealed as by means of plug 130 inserted therein.

Means for detecting and/or recording the current produced by cell 34, upon movement of piston 148, include therein electrical lead 158 connected to bushing 140 through voltmeter 160, resistance 162 and a second lead 164 which is connected to wall 122. This constitutes one form of electrical means 168 for measuring the change in an electrokinetic property of fluid 86 under shear in space 156 between surface wall 122 and piston 148. The changes in electrokinetic properties of a shear-responsive liquid vary as the temperature of the liquid varies. Accordingly, in the preferred embodiment electrical means 168 includes a temperature-compensating means. The simplest form of temperature-compensation consists of a resistor such as 162 or a series of resistors, of fixed or variable form connected in parallel or series (as shown in FIGURE 4) with voltmeter 160. Resistor 162 has a positive temperature coefficient of resistance of the same magnitude as the negative coefficient of the shear responsive liquid used, or conversely, depending on the particular shear-responsive liquid used.

In operation and construction, this single electrokinetic-electrostrictive cell 34 is one of a plurality of such devices connected to mass 40, as illustrated in FIGURE 1. For practical purposes the electrical circuitry has been simplified. One skilled in the art knows the various modifications that can be made to increase the sensitivity, output and/or operational range of the component parts of the circuit.

One form of cell 34, with signal pick-up circuitry and the foregoing relationship of these parts is described in more detail in copending application Ser. No. 332,484, filed Dec. 23, 1963 by the instant inventors and R. B. McEuen. According to the said copending application certain obvious modifications in cell 34 and circuit 168 can be made. Thus the electrical connection of lead wire 158, in FIGURE 4, may be made by direct connection to rod 136 rather than to bushing 140. A definite annular space 156 must be maintained in the cell during operation of the device. For this purpose, piston 148 is guided in uniformly spaced relationship by means of bushing 140, and one or more longitudinal insulating guide means 150 located along the inner walls of cell 34. Piston 148 fits closely against the guide means 150 to maintain annular space 156 at a uniform dimension.

Figure 5:
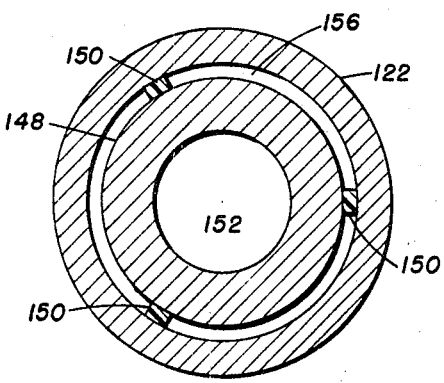
FIGURE 5 is a sectional view along lines 5—5 of FIGURE 4.

This relationship of guides 150 and piston 148 is shown in cross-sectional view FIGURE 5, taken along lines 5—5 in FIGURE 4. Also one or more vertical guide rods (not shown) may be provided extending upwardly from the bottom wall 124 of cell 34 into an aperture (not shown) in piston 148, whereby the straight-line sliding relationship of piston 148 is maintained.

The device shown in FIGURES 4 and 5 is merely illustrative. For example, other cross-section forms thereof may be used, that is, piston 148 and cell 34 need not be cylindrical in cross-section, nor do these parts have to have the same cross-sectional configuration. Other embodiments thereof are shown in said copending application Ser. No. 332,484, now Patent No. 3,196,963.

Figure 6:
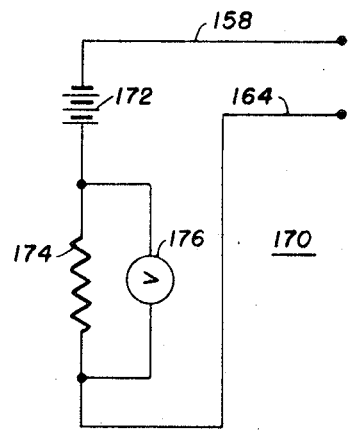
FIGURE 6 is another form of indicating circuit.

As hereinbefore disclosed, electrokinetic properties other than induced potential may be utilized to determine the relative movement of mass 40 in accordance with the objectives of this inventon. Thus, the change in resistivity of the shear-responsive liquid 86 as it is sheared in annular space 156 may be used. To accomplish this, circuit 170 is shown in FIGURE 6. Circuit 170 has leads 158 and 164 (of FIGURE 4) connected, respectively, to a D.C. potential source 172 and resistor 174, and voltmeter 176 is connected in parallel across resistor 174. Voltmeter 176 is calibrated to read in fractional voltages. By precalibrating voltmeter 176 to read in terms of acceleration and deceleration, the desired function of the apparatus is attained. The reading of voltmeter 176 will change as the movement-induced shear rate of the shear-responsive liquid changes. Circuits 168 and 170 constitute simplified single-signal detection means to measure relative motion of mass 40.

Referring to FIGURES 1 to 6, the movement of the housing enclosing the apparatus in any direction causes a movement of mass 40 in relation to the cells 34, 36 and 38 which movement is transmitted to rods 42, 44, 46 and results in one or more signals being produced by the mechanofluid-electrofluid cells 34, 36, 38, etc., proportional to said movement and indicating its direction. The mechanical arrangement shown, thus far, provides omnidirectional mounting of mass 40 through the supporting rod members regardless of the direction of movement of mass 40. This mounting action is also carried by cover 125 by using plastic, rubber, reinforced rubber, laminates and the like in its construction.

Figure 7:
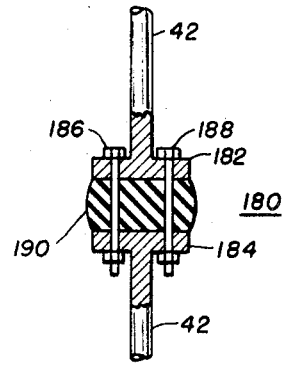
FIGURE 7 is a partial cross-sectional view of a flexible coupling.

Another means, complementing or replacing the mounting action of cover 125 is shown in FIGURE 7, a partial cross-sectional view, wherein connecting rod 42 of FIGURE 1 is fitted with a flexible coupling 180 formed by flanges 182 and 184, bolts 186 and 188 extending therethrough, to hold resilient member 190 composed of rubber and the like therebetween. Each of the rod members 42, 44 and 46 in FIGURE 1 may be equipped with flexible couplings 180 and/or the cells thereof may have flexible covers 125 to accomplish this function. Alternatively, these flexible couplings 180 and covers 185 may be omitted and the mounting action attained by using flexible connecting members 42, 44, 46 in place of rods as shown.

In another embodiment of this invention, the apparatus shown in FIGURES 1 to 6 is provided with non-conducting means for biasing each pair of opposed connectors 42–42', 44–44', and 46–46' away from each other to hold inertial mass 40 in omnidirectional responsive equilibrium. This can be accomplished by providing a plurality of individual biasing members (not shown) attached between mass 40 and walls 10, 12, etc., of the housing for the apparatus.

Another means for accomplishing this purpose is shown in FIGURE 4 wherein non-conducting spring member 154 is shown attached between piston 148 and the bottom 124 of cell 34. By providing a plurality of such spring-loaded cells 34, the mass 40 is held in equilibrium until the housing is moved spacially at a rate or direction different from mass 40. Any means may be used to attach spring 154 between the piston and bottom 124. Instead of biasing the piston 148 to the bottom of cell 34, it may be biased away from the top 125 by means of a compression spring between the cover member 125 and the top of the piston 148. In this latter embodiment the compression spring may encircle rod 136 and may be a conductor of electricity.

In still another embodiment of this invention the various electrokinetic-electrostrictive cells 34 may take the form of electrokinetic couplings having a rotation electrode spaced from a reciprocable electrode. Mass 40 is connected to the reciprocable electrode in the manner shown in FIGURES 1 and 2. Movement of the mass 40 toward or away from cell 34 causes the distance between the electrodes to vary and the current generated thereby is similarly varied proportional to the distance, the current being higher (more shear) when the electrodes are close and lower (less shear) when the electrodes are separated further apart. This embodiment is illustrated in FIGURE 8, which is a partial cross-sectional view of a modified coupling adapted to accomplish the foregoing purposes.

Figure 8:
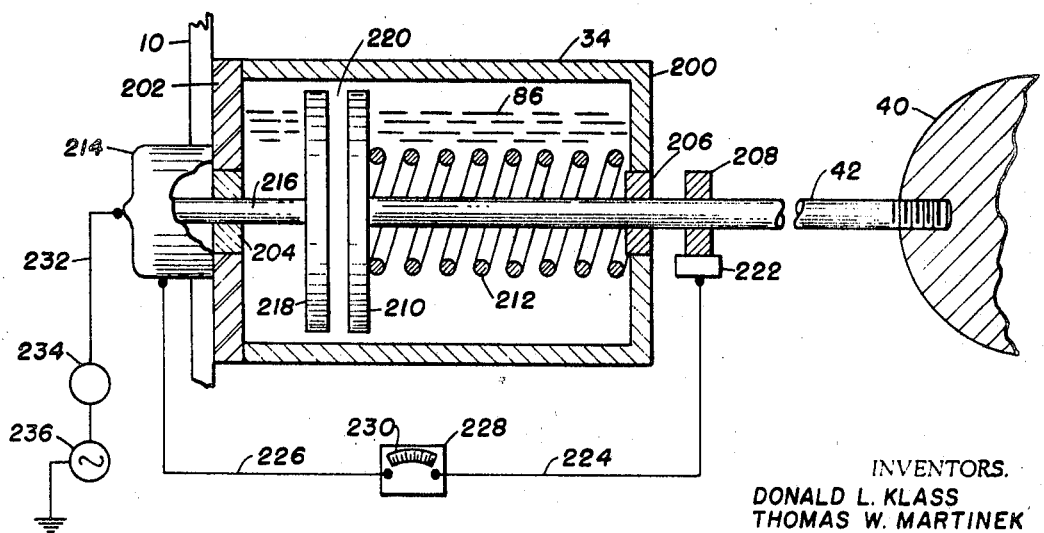
FIGURE 8 is a partial cross-sectional view of one form of cell 34.

In FIGURE 8, another form of cell 34 is shown wherein the numeral 200 designates a housing or container for electrokinetic-electrostrictive fluid 86. Housing 200 has an insulated top or end cover 202 and axially aligned bearing members 204 and 206 in the end walls thereof. Shaft or rod 42 passes through slip ring 208 and bearing 206, and carries the reciprocating coupling member 210 within housing 200. Spring 212 biases rod 42 and coupling 210 in both directions, i.e., it holds same in equilibrium under conditions of no motion of mass 40, attached to the extended end of rod 42. Motor 214 drives shaft 216, carrying rotating coupling member 218. The space 220 between coupling members 210 and 218 is the area of shear of the fluid 86 which fills the interior of housing 200. Contact brush 222 provides the take-off from slip ring 208 and electrical leads 224 and 226 connect through meter 228, having recording scale 230, to shaft 216 via motor 214. Lead 232 connects through constant speed control 234, which may be of any type designed to operate at a constant speed and to AC source 236 and thence to ground. A plurality of electrofluid couplings of this type or the equivalent may be used as cells 34, 36 and 38, etc., in FIGURE 1. The unit is shown attached to wall 10, forming the housing for the apparatus.

In operation, coupling member 218 is rotated at substantially constant r.p.m. by motor 214 and speed control 234. Spring 212 and mass 40 are in equilibrium, so space 220 is constant. The current generated by the shearing action taking place in space 220 is constant and meter 228 records or indicates a constant value with time, distance or both. Under the impetus of movement of wall 10 of the housing with respect to mass 40, shaft 42 is moved in either direction, producing a corresponding change in the dimension of space 220. Movement of shaft 42 and coupling 210 toward coupling 218, reduces the dimension of space 220. This causes a proportional increase in shear of fluid 86 with a corresponding increase in current developed. This signal is picked up and recorded and/or shown by meter 228. A differential amplifier and integrator circuit as disclosed in FIGURES 1 and 3 can be substituted for meter 228.

The electrokinetic-electrostrictive fluid compositions 86 utilized in the apparatus and method so far described from no part of the invention, and, for the purpose of this specification and claims, the term "liquid" is intended to include liquids in the ordinary sense of the term, i.e., readily flowing compositions, and compositions of relatively high viscosity, i.e., those having a grease-like consistency at room temperature. In general, these fluid compositions will consist of at least about 1% by volume, and preferably 5 to 48% by volume, of particulate poorly-conducting materials dispersed in a non-polar oleaginous vehicle, which has a dielectric constant less than about 5. The particulate material selected must be insoluble in the oleaginous vehicle in which it is dispersed.

The poorly-conducting particles, which may be either of piezoelectric or non-piezoelectric materials, have an average size in the range of about 0.001 to 5.0 microns diameter, preferably about 0.01 to 1.00 micron diameter. Finely divided silica (a non-piezoelectric material) is especially suitable for use in such shear-responsive liquids. Examples of other poorly-conducting particles which may be used include aluminum octoate, aluminum oleate, aluminum stearate, barium titanate, calcium stearate, activated charcoal, crystalline D-sorbitol, lead oxide, lithium stearate, magnesium silicate, micronized mica, white bentonite, zinc stearate, vanadium pentoxide, basic aluminum acetate, etc.

The oleaginous vehicle in which the poorly-conducting particles are dispersed is preferably a refined mineral oil fraction having a viscosity within the range of about 50 to 300 SUS at 100° F. However, a wide variety of non-polar oleaginous materials can be employed. Examples of suitable materials include white oils, lubricating oil stocks such as 80 neutral oil, transformer oils, synthetic oils resulting from polymerization of unsaturated hydrocarbons, alpha methyl benzyl ether, benzene, bromocyclohexane, chlorinated paraffin, dibenzyl ether, dichloroethyl ether, chlorinated or fluorinated hydrocarbons in the lubricating-oil viscosity range, N-butyl ether, silicate ester, toluene, etc.

Where volumes of the poorly-conducting particles in high concentrations are incorporated in the liquid, to form the electrokinetic-electrostrictive fluid, it is usually necessary to add a material to fluidize the mixture and keep the viscosity of the fluid at a reasonable level. For this purpose, varying amounts of a neutral surfactant can be incorporated to maintain the mixture of silica and vehicle as a fluid. Suitable neutral surfactants which may be used include polyoxyalkylene ethers, hydroxyethers, polyhydroxyethers and esters, as well as neutral sulfonates and other neutral surfactants. Other neutral polar organic materials such as $C_6$–$C_{30}$ mono- or polyhydric alcohols are suitable fluidizers. Suitable neutral fluidizers also include glycerol monooleate, sorbitan sesquioleate, glycol monooleate, alkyl aryl polyether alcohols, sodium dialkylsulfosuccinate, hexyl ether alcohol, butyl Cellosolve, octyl alcohol and dodecyl alcohol. The neutral fluidizer may be added in quantities sufficient to fluidize the mixture of vehicle and particles, but usually not more than is necessary to obtain sufficient fluidity should be used. The amount added will seldom exceed about 25% by volume.

A variety of polar materials, including water, may be used to alter the properties of the shear-responsive liquid. Lower hydroxy-substituted hydrocarbons have been found to be highly efficient. Especially preferred are the aliphatic polyhydroxy-substituted hydrocarbons such as ethylene glycol. In general, activating material in the range of about 0 to 10% by volume will be added to the shear-responsive liquid.

The following readily flowing, shear-responsive electrokinetic-electrostrictive liquid is set forth only as an example of one suitable fluid which may be utilized.

| | Wt. percent |
|---|---|
| Silica | 48.48 |
| Water (absorbed on the silica) | 6.18 |
| Glycerol monooleate | 17.75 |
| 80 vis. neutral oil | 27.59 |

From the foregoing description it is seen that this invention is directed to an apparatus comprising the combination of an omnidirectional inertial mass connected to at least one electrokinetic-electrostrictive coupling or to at least one pair of electrokinetic-electrostrictive couplings along one axis or at least three pairs of electrokinetic-electrostrictive couplings positioned on the three different directions or X, Y, Z axes about the inertial mass. The couplings are capable of operation over the spherical region covered by movement of the mass and are so designed that the shear rate to which the shear-responsive or electrodynamic fluid is subjected depends on the magnitude and direction of the force causing movement of the mass. A single electrokinetic coupling or a single electrostrictive coupling can be used in combination with an inertial mass. In any pair of couplings one can be electrokinetic and the other electrostrictive.

Directional sensing properties are incorporated into the device by using different kinds of couplings in a pair. The signal from each unit 34 can be individually recorded or the composite signal used. In operation, an electric bias can be applied to the couplings to keep the inertial mass centered. This can be accomplished by means of solenoids.

The device, when in operation on earth is automatically oriented as by fixation to a vehicle or other object. While in space it is oriented with respect to an external fixed point, such as the earth or a star by means of an external sensor. The acceleration or deceleration of the housing or device causes movement relative to the inertial mass. The direction and magnitude of the movement causes variable changes in the electric property (e.g., voltage, amperage, wattage) being monitored at the different fluid couplings which contain precalibrated electrokinetic-electrostrictive fluids. These measurements are processed by a computer or other suitable means to give acceleration, velocity achieved (first integral), distance traveled, and direction of travel, and hence the movement pattern of the vehicle containing the device.

The rate of change of the property of the electrokinetic-electrostrictive fluid being monitored has been correlated with rate of change of shear rate and hence acceleration. After acceleration has reached a maximum particular value, and any decrease is introduced, either zero or a gradual reduction in acceleration, the inertial mass begins to move back to its equilibrium position. At this point, one of the couplings being used as an electrostrictive coupling can actuate a power supply to automatically impress an electric field across the parent coupling, to hold the inertial mass at its position of maximum acceleration, thereby affording a measurement of the maximum acceleration. When the apparatus of this invention is to be employed in monitoring the motion of an object traveling through the fluid, it may be desirable to provide a continuous indication of velocity. This can be accomplished by converting the kinetic energy of the environmental fluid into some form of energy that can be consumed by the fluid cell by conversion to shear therein. For example this can be accomplished by positioning a wind vane or similar apparatus in contact with the environmental fluid passing by the object and converting the relative kinetic energy thereof into rotational shearing forces within the cell. The variation in impedance properties of the electrofluid contained within the cell can be monitored by a simple series electrical circuit and is correlatable with the velocity of the environmental fluid relative to the electrofluid cell. This invention can also be employed as an accelerometer by measuring the position with time of the inertial mass, i.e. the time rate of change of velocity.

The axial support of inertial mass 40 need not be symmetrical but for simplicity in design and circuitry the use of symmetrical axes is preferred. Also the supporting rod members need not be arranged in a straight-line relationship through the center of mass 40 and any number of supporting rods may be used within this invention. It is apparent that other modifications can be made by one skilled in the art in view of the instant disclosure, to include the following:

The use of tapered cells such as that shown in FIGURE 2 is only necessary where the relative direction of movement of the mass 40 within housing 10 is desired or needed. If only acceleration is to be measured, as in a moving vehicle on land where direction is known or fixed, the cells need not be designed to differentiate internal direction. The device and method as described encompasses direct connection between the mass and cell combinations and the electrical means for measuring or detecting the signal produced, e.g. the device and the instruments are moving together. It is obvious that the signal from the cells can be transmitted by radio waves or the like to the various electrical measuring and/or detecting means, e.g. the device (the mass, cells and radio transmitter) are moving and the instruments, including a radio receiver, are at a stationary location or may also be moving but separated from the device. Accordingly both direct and indirect measurements used for control can be made in accordance with this invention.

The device of this invention accordingly provides a device for the measurement of acceleration, deceleration, velocity, distance-traveled and direction when the dimension of time is incorporated as the device moves in space.

The embodiments of this invention in which an exclusive property or privilege is claimed are defined as follows:

1. A device for indicating the relative spacial movement of a body comprising a rigid mass supported by said body on three different axes thereof through relatively movable spaced electrically conductive surfaces, a shear responsive liquid confined between said surfaces, shearing means cooperating with said spaced surfaces and said fluid for resolving relative motion of said spaced surfaces into shearing forces in said fluid and inducing a variation in at least one electrokinetic property of said fluid responsive to motion of said mass relative to said body, and circuit means for measuring said change in electrokinetic property of said fluid.

2. A device for indicating the relative spacial movement of a body comprising a rigid mass, a housing surrounding and spaced from said mass, at least one pair of electrokinetic-electrostrictive couplings connected between said mass and said housing, said couplings being responsive to the movement of said mass within said housing in at least one direction and comprising opposed, spaced relatively movable electrical conductors in electrical communication via said shear responsive electrostrictive-electrokinetic fluid and at least one of said conductors being in intimate contact with said fluid, and means for indicating a variation in at least one electrokinetic property of said fluid responsive to shear induced in said fluid by relative motion of said conductors.

3. An acceleration indicating device comprising a rigid mass, a housing surrounding said mass and spaced therefrom on all sides, connecting means located between said mass and said housing and being responsive to the movement of said mass in said housing in substantially all directions, said housing having a plurality of spaced electrically conductive surfaces extending inwardly into said space toward said mass, said mass having a plurality of matching spaced electrically conductive surfaces extending outwardly into said space opposed to and relatively movably spaced from said electrically conductive surfaces of said housing, means for confining a shear responsive liquid between each pair of said opposed electrically conductive surfaces, shearing means cooperating with said spaced surfaces and said fluid for resolving relative motion of said spaced surfaces into shearing forces in said fluid and inducing a variation in at least one electrokinetic property of said fluid responsive to motion of said mass relative to said body, and means for indicating the change in electrokinetic property of said fluid in response to the displacement of said mass in relation to said housing.

4. An acceleration indicating device in accordance with claim 3 in which one of said pairs of spaced electrically conductive surfaces comprises, in combination, a fluid cell having an inner frusto-conical conductive surface confining said shear responsive fluid, a matching frusto-conical piston reciprocatively mounted within said fluid cell and having its outer conductive surface in substantially parallel spaced relationship with the inner surface of said cell.

5. A motion indicating device comprising a rigid mass, a housing member surrounding said mass and spaced therefrom, a plurality of rods mounted on one end to said rigid mass, and at the other end to the inside of said housing member, at least one fluid cell mounted intermediate the ends of each of said rods, each of said cells having an inner frusto-conical conductive surface confining a conductive shear responsive fluid, a matching frusto-conical piston reciprocatively mounted within said fluid cell and having an outer conductive surface opposed to and spaced from said inner surface, said outer and inner surfaces being separated by said fluid, whereby movement of said rigid mass in relation to said housing causes a corresponding movement of said rods and pistons and resultant shear of said fluid between said conductive surfaces, an electrical conduit connected from each pair of said fluid cells to a differential amplifier, and a directional indicator circuit connected to at least two of said differential amplifiers whereby the magnitude and direction of change in spacial relationship of said rigid mass with said housing is detected as a measurement of the motion of said housing.

6. A motion indicating device in accordance with claim 5 in which at least three pairs of rods are connected to said rigid ball along the X, Y and Z axes thereof, separate differential amplifiers are connected to corresponding pairs of said fluid cells for each of said axes and each of said differential amplifiers is connected to a common directional indicator circuit.

7. A motion indicating device in accordance with claim 6 in which each of said rods is segmented at the fluid cell, and that segment connected to said rigid mass is attached to the inner frusto-conical conductive surface member of said cell.

8. A motion indicating device in accordance with claim 5 in which a coupling is connected between said rigid ball and each of said rods.

9. A motion indicating device comprising a rigid mass, a housing member surrounding said mass and spaced therefrom, a plurality of rods mounted at one end to said rigid mass and at the other end to a piston member, said piston member being reciprocatively mounted within a fluid cell containing a shear responsive fluid, said fluid cell being attached to the inside of said housing member, each of said piston members being spaced from the inner wall of said fluid cells and separated therefrom by said fluid, circuit means for imposing a potential drop across at least a portion of said fluid separating said piston and said inner wall and further comprising means for detecting variation in the conductivity of said fluid.

10. A motion indicating device in accordance with claim 9 wherein at least one of said rods disposed between said mass and said housing further comprises biasing means for controlling the position of said mass relative to said housing.

11. A motion indicating device comprising a rigid mass, a housing member surrounding said mass and spaced therefrom, a plurality of rods connected to said rigid mass, a stationary coupling on the extended end of each of said rods, a fluid cell surrounding each of said stationary couplings and attached to said housing, a rotatable coupling and a shear-responsive fluid in said fluid cell, means for rotating said rotatable coupling means for inducing a voltage differential across at least a portion of said fluid disposed between said rotatable and stationary couplings, means operative by at least one of said voltage differential and the resultant current flow through said portion of said fluid for detecting variation in the electrical properties of said fluid responsive to shear imposed by relative motion of said stationary and rotatable couplings.

12. A motion indicating device in accordance with claim 11 in which said stationary coupling is biased toward said rotatable coupling.

13. A motion indicating device in accordance with claim 11 in which said means for detecting the change in electrical signal includes a voltmeter connected between said couplings and said means for rotating said rotatable coupling comprises a constant speed motor and source of constant electrical power connected thereto.

14. The method of determining the relative spacial movement of a mass which comprises movably disposing a mass along at least one directional axis between conductive spaced surfaces within a shear responsive liquid adapted to produce a change in an electrokinetic property proportional to shear, moving said mass in a path in space, causing a change in speed, direction or both in said movement in relation to said directional axis and determining the value of said change by measuring the induced change in electrokinetic property of said fluid.

15. The method of determining the relative spacial movement of a mass which comprises movably disposing a mass along at least one directional axis between shear responsive fluid cells containing a shear responsive fluid subject to change in an electrokinetic property proportional to shear, moving said mass in a path through space, causing a change in speed, direction or both in the movement of said mass whereby a proportional change in the shear of at least one of said fluid cells occurs and determining the value of said change by measuring the induced change in electrokinetic property of said shear responsive fluid in at least one of said fluid cells.

16. A device in accordance with claim 5 wherein at least one of said connecting means further comprises biasing means for controlling the position of said mass relative to said housing.

17. A device in accordance with claim 16 wherein said biasing means comprises means for imposing a potential drop across said fluid.

18. A device in accordance with claim 10 wherein said biasing means comprises means for imposing a potential drop across said fluid.

References Cited

UNITED STATES PATENTS

| 3,196,963 | 7/1965 | Klass | 177—1 |
| 3,309,915 | 3/1967 | McEuen | 73—71.2 |
| 2,338,732 | 1/1944 | Nosker | 73—518 |

RICHARD C. QUEISSER, Primary Examiner

J. WHALEN, Assistant Examiner

U.S. Cl. X.R.

73—517, 523, 526